United States Patent [19]

McHugh

[11] Patent Number: 4,993,453

[45] Date of Patent: Feb. 19, 1991

[54] VALVE AND ARRANGEMENT FOR FIRE SUPPRESSION WATER SPRINKLER SYSTEM

[75] Inventor: George J. McHugh, Broomall, Pa.

[73] Assignee: AGF Manufacturing, Inc., West Chester, Pa.

[21] Appl. No.: 320,716

[22] Filed: Mar. 8, 1989

Related U.S. Application Data

[63] Continuation-in-part of Ser. No. 138,436, Dec. 28, 1987, Pat. No. 4,852,610, which is a continuation-in-part of Ser. No. 881,270, Jul. 2, 1986, Pat. No. 4,741,361, which is a continuation-in-part of Ser. No. 874,653, Jun. 16, 1986, abandoned.

[51] Int. Cl.⁵ .................... G01M 19/10; F16K 5/10
[52] U.S. Cl. .................... 137/559; 251/206; 251/208; 251/209; 251/315; 73/168
[58] Field of Search ............. 137/559; 251/206, 207, 251/208, 209, 309, 315; 73/168

[56] References Cited

U.S. PATENT DOCUMENTS

| | | | |
|---|---|---|---|
| 350,510 | 10/1886 | Stretch | 73/332 |
| 421,224 | 2/1890 | Applegarth | 251/207 |
| 926,774 | 7/1909 | Schmidt | 174/102 R |
| 1,023,104 | 4/1912 | Carpenter | 251/207 |
| 1,056,344 | 3/1913 | Lester | 251/207 |
| 1,229,038 | 6/1917 | Cornelius | 251/207 |
| 1,264,775 | 4/1918 | Coles | 251/207 |
| 1,333,048 | 3/1920 | Webster | 251/207 |
| 1,428,744 | 9/1922 | Bastian et al. | 137/625.45 X |
| 1,666,918 | 4/1928 | Scoville | 184/96 |
| 1,757,237 | 5/1930 | Deutsch | 73/332 |
| 1,825,512 | 9/1931 | Durham et al. | 251/207 |
| 2,491,361 | 12/1949 | Burdick | 137/625.47 X |
| 2,621,012 | 12/1952 | Graham | 251/207 |
| 2,660,560 | 11/1953 | Pickard | 137/559 |
| 2,859,611 | 11/1958 | Morse | 73/168 |
| 3,016,062 | 1/1962 | Zinniger | 137/270 |
| 3,021,869 | 2/1962 | Ross | 137/625.24 |
| 3,052,445 | 9/1962 | Kessler | 251/309 |
| 3,131,716 | 5/1964 | Griswold et al. | 137/559 |
| 3,134,405 | 5/1964 | White et al. | 251/207 |
| 3,139,907 | 7/1964 | Jones | 137/625.47 X |
| 3,148,695 | 9/1964 | Groen, Jr. et al. | 251/309 X |
| 3,233,865 | 2/1966 | Panzica et al. | 251/309 X |
| 3,251,419 | 5/1966 | Howard | 137/625.47 X |
| 3,273,595 | 9/1966 | Novak | 137/637.4 |
| 3,314,643 | 4/1967 | Sachnik | 251/309 |
| 3,345,032 | 10/1967 | Rawstron | 251/315 |
| 3,347,516 | 10/1967 | Linde | 251/309 X |

FOREIGN PATENT DOCUMENTS

| | | |
|---|---|---|
| 963446 | 2/1975 | Canada . |
| 42304 | 8/1908 | Switzerland . |
| 110371 | 6/1925 | Switzerland . |

OTHER PUBLICATIONS

"Standard for the Installation of Sprinkler Systems", NFPA 13, 1983 Edition, pp. 13-135.
Brochure from Victaulic dated Jun. 1986.
Brochure from Sunbelt Marketing, Inc. dated Apr. 15, 1986.
Brochure from Triple "R" Specialty Co. dated Nov. 1986.
Brochure from Fire Sprinkler Fittings Co. dated Aug. 1986.

(List continued on next page.)

*Primary Examiner*—John Rivell
*Attorney, Agent, or Firm*—Burns, Doane, Swecker & Mathis

[57] ABSTRACT

A valve and an arrangement for testing and draining a fire suppression water sprinkler system includes a valve which has a thinly walled valve member for allowing fluid flow from an inlet to an outlet of the valve. The thinly walled nature of the valve member provides for economical fabrication of the valve. The selective rotation of the valve member interrupts a flow of water through the valve and permits a flow at two different preselected flow rates. The first preselected flow rate permits a drainage of the sprinkler system and the second preselected flow rate permits a testing of the sprinkler system.

34 Claims, 9 Drawing Sheets

U.S. PATENT DOCUMENTS

| | | | |
|---|---|---|---|
| 3,385,318 | 5/1968 | Kilbourn | 137/557 |
| 3,386,461 | 6/1968 | Fisher | 251/207 |
| 3,517,554 | 6/1970 | Smith | 73/332 |
| 3,525,363 | 8/1970 | Gore et al. | 251/309 X |
| 3,567,176 | 3/1971 | Johnson | 251/309 X |
| 3,604,631 | 9/1971 | Etter | 239/414 |
| 3,674,238 | 7/1972 | Pickles et al. | 251/309 |
| 3,817,097 | 6/1974 | Heroux | 73/168 |
| 3,854,497 | 12/1974 | Rosenberg | 137/557 |
| 3,939,871 | 2/1976 | Dickson | 137/625.47 |
| 3,986,397 | 10/1976 | Perreault | 73/193 R |
| 4,108,207 | 8/1978 | Doody | 137/625.47 |
| 4,130,128 | 12/1978 | Kaneko | 251/207 |
| 4,177,832 | 12/1979 | Price | 251/315 |
| 4,208,033 | 6/1980 | Kesterman | 137/385 |
| 4,244,393 | 1/1981 | Lehtinen | 137/559 |
| 4,273,152 | 6/1981 | Freeman | 251/315 |
| 4,399,977 | 8/1983 | Wheatley | 251/315 |
| 4,643,224 | 2/1987 | Rung | 137/559 |
| 4,655,078 | 4/1987 | Johnson | 73/168 |
| 4,657,222 | 4/1987 | Tuillo | 251/309 X |

VALVE AND ARRANGEMENT FOR FIRE SUPPRESSION WATER SPRINKLER SYSTEM

This application is a continuation-in-part application of my copending application entitled Valve and Arrangement for Fire Suppression Water Sprinkler System, Ser. No. 138,436 filed Dec. 28, 1987, now issued as U.S. Pat. No. 4,852,610 which in turn is a continuation-in-part application of my application of the same title, Ser. No. 881,270, filed on July 2, 1986 and now issued as U.S. Pat. No. 4,741,361, which in turn is a continuation-in-part application of my application of the same title, Ser. No. 874,653, filed on June 16, 1986, now abandoned.

BACKGROUND AND SUMMARY OF THE PRESENT INVENTION

The present invention relates generally to valves and more particularly relates to valve arrangements for use in testing and draining fire suppression water sprinkler systems.

In a typical fire suppression water sprinkler system as installed in many buildings, an array of individual fire sprinklers is supplied with water through a main conduit and various branch conduits. The individual fire sprinklers are generally provided with a member that melts when the ambient temperature reaches a predetermined level indicative of a fire. The melting of the member opens a sprinkler to spray water in order to suppress the fire. The individual fire sprinklers are provided with meltable members so that the spray of water will hopefully be limited to the region of the building where the fire is present. In this way, the extent of water damage may be minimized.

After a fire, and especially during maintenance and renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

In addition, it is desirable (and sometimes required by the applicable fire code) to be able to visually observe the flow of water from the testing valve. Since the testing valve (and oftentimes the drainage valve) is frequently connected directly to a drain pipe, it is conventional to provide a sight glass downstream of the testing valve (and sometimes the drainage valve). It is, of course, possible to alternatively place a sight glass upstream of the testing valve. Also, since it is typically desirable to determine the pressure of the water upstream of the testing valve, prior to and during a test operation, it is conventional to provide a fitting or port to receive a pressure gauge upstream of the testing valve.

Initially, it was common in the art to provide separate drainage valves and testing valves in the fire suppression system and this resulted in significant time and expense during installation due to the required amount of hardware and the necessary supportive plumbing. Then, recently, it became known to incorporate the testing valve and the drainage valve into a single device along with a sight glass and a pressure port. One such device was provided by the Fire Protection Division of Victaulic in Easton, Pa. under the designation "Testmaster". Such a device remained relatively expensive and cumbersome, however, since the device simply combined the two separate valves into a single housing.

Still more recently, it became known to incorporate into one housing a single valve having both drainage and testing capabilities as shown in U.S. Pat. No. 4,655,078 to Johnson. The device disclosed in the Johnson patent is configured for use as a section of plumbing in alignment with the pipe sections on either side of the device. The Johnson device is relatively inefficient, however, since the components and specifically, the ball valve, are configured to retain excess weight and comprise an inefficient geometry. The ball valve according to the Johnson patent is overly large and is relatively heavy due to its essentially solid configuration which also adds to the expense of producing the valve.

Accordingly, it is an object of the present invention to provide a valve and arrangement for a fire suppression water sprinkler system which overcomes the disadvantages of the prior art.

Yet another object of the present invention is to provide an arrangement for testing and draining a fire suppression water sprinkler system which is simple to install and use.

Still another object of the present invention is to provide an arrangement for testing and draining a fire suppression water sprinkler system which is relatively inexpensive.

Yet still another object of the present invention is to provide a valve which permits a fire suppression water sprinkler system to be tested and drained.

A still further object of the present invention is to provide a valve which provides two different flow rates for a supply of fluid through the valve.

An additional object of the invention is to provide an arrangement which permits an easy observation of the flow of water through the valve.

These and other objects are accomplished by a valve and an arrangement for testing and draining a fire suppression system according to the present invention.

The arrangement according to the present invention comprises a conduit for supplying water to a plurality of sprinklers with a sensor provided for sensing the flow of water in the conduit. A valve is provided downstream of the sensor in communication with the conduit.

The valve has a housing which defines an interior chamber with an inlet and an outlet. A thinly walled valve member provided within the housing has first, second and third apertures arranged about an outer periphery of the member that allow varying amounts of fluid flow between the inlet and the outlet of the interior chamber.

In additional embodiments, a valve member may be provided that has only two apertures or only one aperture for allowing varying amounts of fluid flow. The valve member preferably may be in the shape of a sphere, a cylinder or a truncated cone. The valve member is selectively positionable within the interior chamber in either of three positions. The first position prevents fluid flow from the inlet to the outlet. The second position allows a restricted fluid flow from the inlet to the outlet. The third position allows an unrestricted fluid flow from the inlet to the outlet. A surface of the valve member is selectively sealingly received by a seat member disposed adjacent the outlet. Means are provided for selectively moving the valve member amongst the first, second and third positions.

Additionally, a sight glass housing may be provided, either as a unitary portion of the valve housing or as a separate element, which presents two sight glasses at a substantially 90 degree angle to one another so as to simplify the task of determining whether water is flowing past the sight glass housing. For example, by providing two sight glasses, light is permitted to enter one of the glasses at an angle to the line of vision through the other sight glass so as to illuminate the interior of the sight glass housing.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENTS

Figures 1, 2:
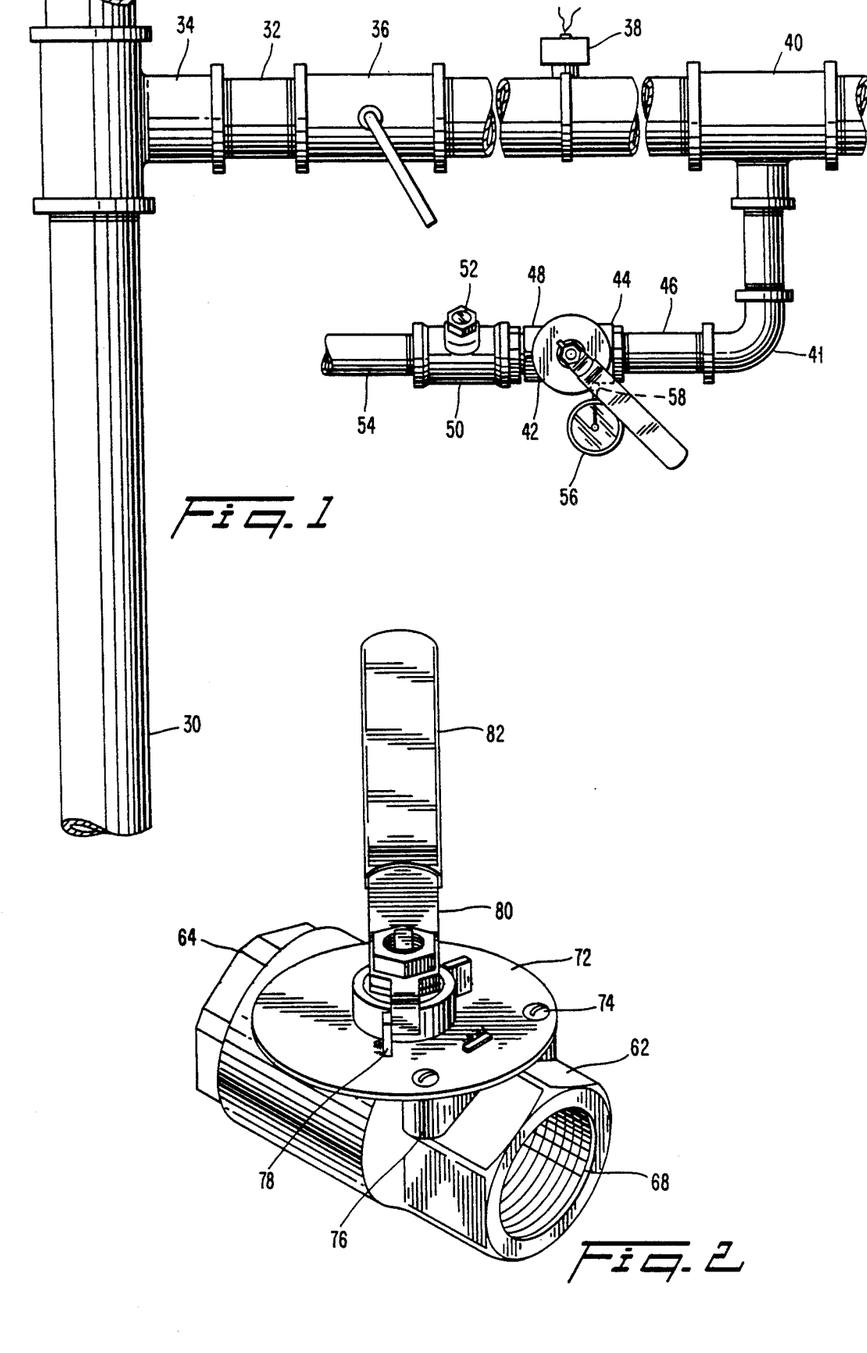
FIG. 1 is a front view of an arrangement for testing and draining a fire suppression water sprinkler system according to the present invention.
FIG. 2 is a pictorial view of a valve according to the present invention.

With reference to FIG. 1, an arrangement for testing and draining a fire suppression water sprinkler system includes a main conduit 30 for supplying water. The conduit 30 supplies a branch conduit 32 by way of a Tee fitting 34. A main valve 36 is provided in the branch conduit 32 with the main valve 36 operable to permit or to interrupt the flow of water through the branch conduit 32.

Downstream of the main valve 36 is provided a water flow switch 38. The water flow switch 38 is of suitable conventional design and typically includes a paddle or other member (not shown) which extends into the branch conduit 32. The paddle is connected to a switch which is closed when the flow of water through the branch conduit is sufficient to move the paddle a predetermined amount. Closure of the switch provides an electrical signal which may be used to trigger a fire alarm or to alert a fire department.

Downstream of the water flow switch 38 but upstream of a plurality of individual water sprinklers (not shown) is a Tee fitting 40. The Tee fitting 40 is preferably provided at a location which is physically lower than the portion of the branch conduit 32 downstream of the Tee fitting 40 and also physically lower than all of the individual water sprinklers and the associated system of supply conduits which are supplied with water by the branch conduit 32. In this way, the entire water sprinkler system downstream of the Tee fitting 40 may be drained as desired through the Tee fitting 40.

As is conventional in the art, the individual fire sprinklers (not shown) are provided with a member that melts when the ambient temperature reaches a predetermined level indicative of a fire. Upon melting, the member opens the fire sprinkler to spray water to suppress the fire.

When it is desired to replace one or more of the individual water sprinklers, the valve 36 is closed and then the water sprinkler system is preferably drained, so that the removal of one or more of the individual water sprinklers will not result in a flow of water through the fitting for the water sprinkler.

Figure 3:
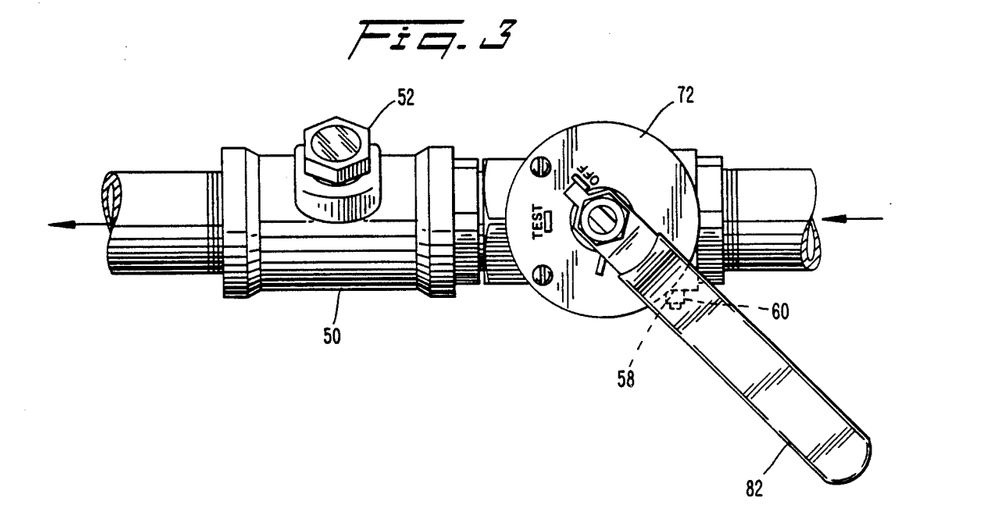
FIG. 3 is a front view of the valve of the arrangement of FIG. 1 with the pressure gauge removed.

The Tee fitting 40 provides communication between the branch conduit 32 and a valve 42 according to the present invention (see also FIG. 3). The valve 42 has an inlet 44 which is threaded onto a nipple 46 which is in turn threaded into an elbow joint 41. The elbow joint 41 is then threaded into the Tee fitting 40. Other arrangements for connecting the inlet of the valve to the branch conduit 32 will be readily obvious to one skilled in the art. For example, it may be highly preferred to orient the valve 42 vertically rather than horizontally and thereby eliminate the elbow 41.

An outlet 48 of the valve 42 is connected to a fitting 50 having a pair of sight glasses 52 threadably received at two couplings of the fitting which are separated from each other by an angle of about 90 degrees.

Figure 4:
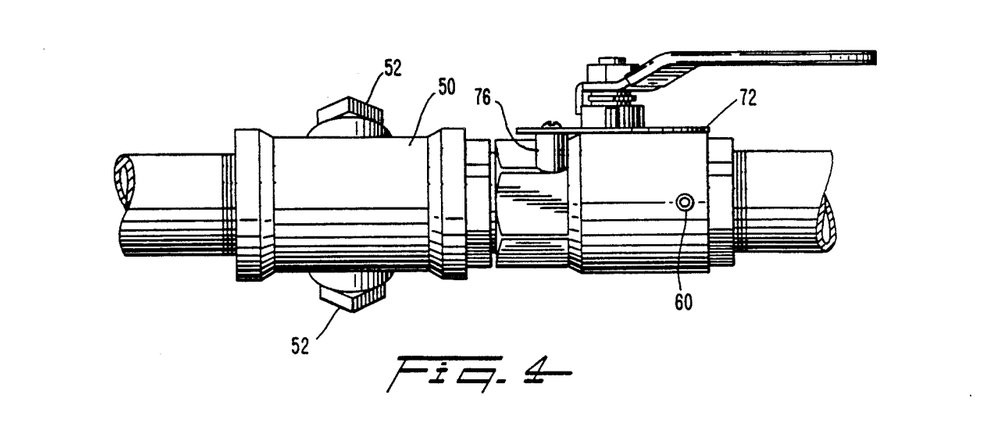
FIG. 4 is a bottom view of the valve of FIG. 3.

As can be seen from FIGS. 1, 3 and 4, it is preferred that the sight glasses 52 on the housing 50 be offset 45 degrees to either side of a longitudinal line extending along what would be the top of the fitting 50 when mounted as shown in FIG. 1. However, it is understood that the primary considerations in determining the orientation of the sight glasses are the relationship between the housing and any obstructions, such as walls, that may interfere with a user's access to the sight glasses, and the ease of visibility of a flow through the sight glasses in any given orientation. For example, if a wall extends along the back side of the arrangement shown in FIG. 1, then it may be preferable that the sight glasses be located in the housing either as shown, or in a position presenting both of the sight glasses at the front side of the arrangement.

Since a primary indicator of fluid motion through the housing 50 is air bubbles passing therethrough, it is preferred that at least one of the sight glasses be provided near the top of the housing so that air is trapped within the housing 50 adjacent the sight glass to facilitate viewing of the water and bubbles. However, other constructions are possible. For example, if permitted by local ordinances, the sight glasses may be mounted in a configuration previously described with respect to FIGS. 1, 3 and 4 yet mounted on the nipple 46. In this manner, the sight glasses would be located upstream of the testing valve.

By employing the preferred sight glass arrangement, the visual observation of flow through the valve 42 is enhanced. For example, light from a light source may be directed into the sight glass furthest from the person checking the flow condition. This will illuminate the inside of the sight glass housing thus permitting the person to easily see the flow condition therein through the nearest sight glass. Typically, the flow condition can be determined by the visul detection of air bubbles through the sight glass housing.

An outlet of the fitting 50, in the embodiment of FIG. 1, is connected directly to a drain 54. Alternatively, the fitting 50 may be omitted and the outlet of the valve 42 may be left unconnected. In this way, the flow of water through the valve 42 would be visually observed without the use of a sight glass. If, however, no visual inspection of the flow of water is necessary, the outlet of the valve 42 may be connected directly to the drain 54.

The valve 42 is provided with a pressure gauge 56 which senses the pressure in the valve 42 at the inlet of the valve. The pressure gauge 56 is threadably received by a pressure port 58. If the pressure gauge 56 is omitted, a plug 60 is threadably received by the pressure port 58 (see FIG. 3).

With reference now to FIG. 2, a valve 42 according to the present invention includes a housing 62 having two threaded openings 64 and 68 which are colinear. When in use as in the arrangement of FIG. 1, the second opening 68 is the outlet of the valve and the first opening 64 is the inlet. A stop plate 72 is mounted on the valve housing as by a pair of screws 74 which are threadably received by a mounting bracket 76 provided in the valve housing. The stop plate includes first and second shoulders 78, 80 which limit the movement of a control lever 82. The control lever is permitted by the stop plate to travel between "off", "test" and "drain" positions.

Figures 5, 6:
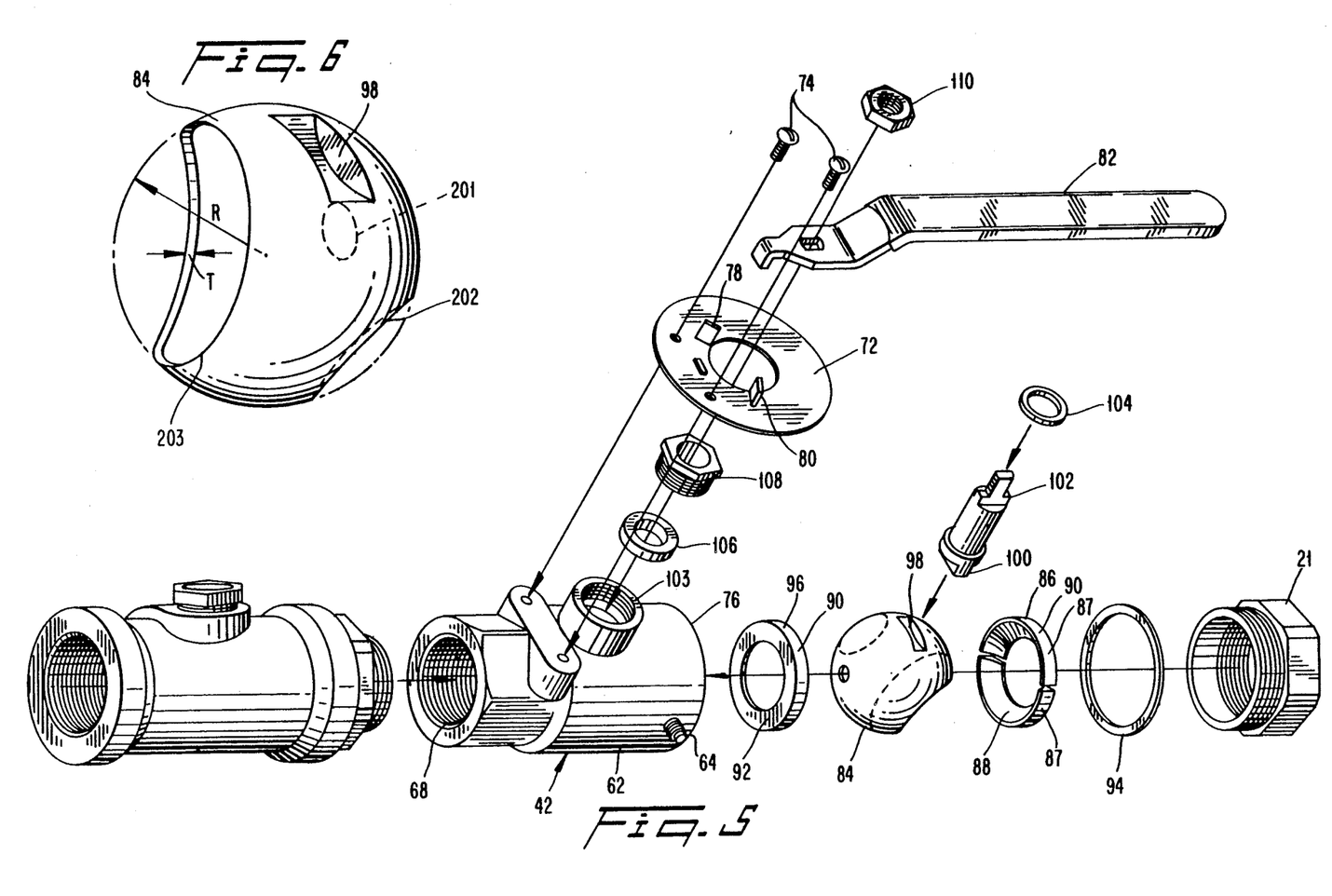
FIG. 5 is an exploded view of the valve of FIG. 3.
FIG. 6 is a pictorial view of the valve member of the valve in FIG. 5.

With reference now to FIG. 5, the valve 42 includes a valve member 84 which is received within an interior chamber of the housing 62 of the valve. In the valve 42 of FIG. 5, the housing is configured so as to receive the valve member 84 through the first opening 64. The valve member 84 is carried by a pair of annular seats 86, 96 which have an inner surface 88 that conforms to the spherical shape of the valve member 84. The annular seat 86 that will be positioned adjacent the first opening 64 at the completion of assembly is preferably comprised of two annular seat elements 87 which, when placed together in an end-to-end manner as shown, form a substantially complete ring.

It is preferred that only about 2 to 4 degrees of gap space exist between the ends of the seat elements when they are in their proper positions in the valve 42 so that water is permitted to enter the seat cavity between the ends to pressurize the cavity. By this construction, it is possible to outfit the valve with a tap for a pressure gauge as shown in FIG. 1, and to get a reliable reading due to the ability of water pressure to reach the tap through the elements 87. Alternatively, the annular seat 86 adjacent the first opening 64 may be formed of a single seat element which includes a radially extending gap therein of about 2 to 4 degrees in width to permit the pressurization of the interior chamber of the housing 62.

Both of the seats 86, 96 also have a peripheral surface 90 and an outer surface 92 which are snugly urged into the interior chamber of the housing 62 by the ball member 84 when the assembly has been completed. When the valve is in the "off" position, the surfaces 90, 92 of the seat 96 adjacent the second opening 68 are forced against the inside surfaces of the housing 62 by the pressure exerted on the seat 96 by the valve member 84.

The seat 96 which is positioned in the interior chamber of the housing downstream of the valve member abuts a shoulder (not shown) of the interior housing. The other seat 86 which is positioned in the interior chamber upstream of the valve member 84 is retained in position by a seal 94. The seal is provided between the seat 86 and a threaded retainer 21 which releasably maintains the valve member and associated seats within the interior chamber of the housing. The retainer and one or more of the threaded openings 64 and 68 are provided with a hexagonal peripheral surface so as to facilitate assembly and disassembly of the valve 42.

The valve member 84 is provided with a slot 98 which is adapted to receive a lowermost tab 100 of a stem 102. The stem is inserted into the valve housing 62 through a threaded opening 103 which is perpendicular to the openings 64 and 68. The stem is provided with an annular bearing 104 and is sealed by a packing 106. A threaded retainer 108 maintains the stem in secure engagement with the slot of the ball member 84.

In a more preferred embodiment, the stem 102 is a "blow-out proof stem" which is inserted into the opening 103 through the first opening 64. The opening 103 is preferably configured so as to have an interior shoulder which receives a corresponding flange of the stem 102. In this way, in the event that the threaded retainer 108 should fail, the stem would not be propelled outwardly by reason of the water pressure acting on the stem.

The stop plate 72 is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the valve member 84 is likewise limited to movement between the "off", "test" and "drain" positions.

In FIG. 6, it is seen that the valve member is made to be thinly walled. That is, the magnitude of the wall thickness T is substantially smaller than the radius R of the valve member thus causing the valve member to be substantially hollow. In addition, in the preferred embodiment, the magnitude of the wall thickness is substantially constant over the circumference of the valve member.

FIG. 6 also shows the valve member to have three apertures 201, 202, 203 arranged on its outer periphery. The first aperture 201 has a cross-sectional area corresponding to the opening provided by one of the individual sprinklers in the fire suppression system. The second aperture 202 has a cross-sectional area which is relatively large in comparison to the first aperture 201 so that water can be quickly drained from the sprinkler system. The third aperture 203 has a cross-sectional area that is yet larger than the second aperture 202 and is situated generally opposite the first and second apertures on the periphery of the ball member. The first, second and third apertures are generally disposed peripherally on the valve member in a manner so that rotation of the valve member in the valve about an axis perpendicular to the axes of all three apertures can selectively bring the apertures into (and out of) communication with the inlet and outlet of the valve. The slot 98 provided in the ball member 84 extends into the valve member in a direction perpendicular to the plane in which the axes of the apertures 201, 202, 203 generally lie.

In this configuration, a valve member is provided that is particularly economical for use in the sprinkler system due, in great part, to its thinly-walled design. First, significant weight saving is realized in the valve member since less material is required to make the valve member. Secondly, reduced cost is realized since significantly less raw material is needed to fabricate the valve member. Thirdly, the thinly-walled configuration lends itself to fabrication by casting or molding and thus may eliminate or minimize costly machining operations that are often needed with solid and/or unsymmetrical valve member configurations.

While the embodiment previously described in the present application includes a spherical shaped valve member, the present invention is readily adapted to other suitable, conventional valve configurations. For example, a plug valve wherein the valve member comprises a cylinder (FIG. 10) or a truncated cone (FIG. 11) could be readily modified for use in the present invention by providing first, second and third apertures in the valve member in the manner discussed above.

Figures 10, 11:
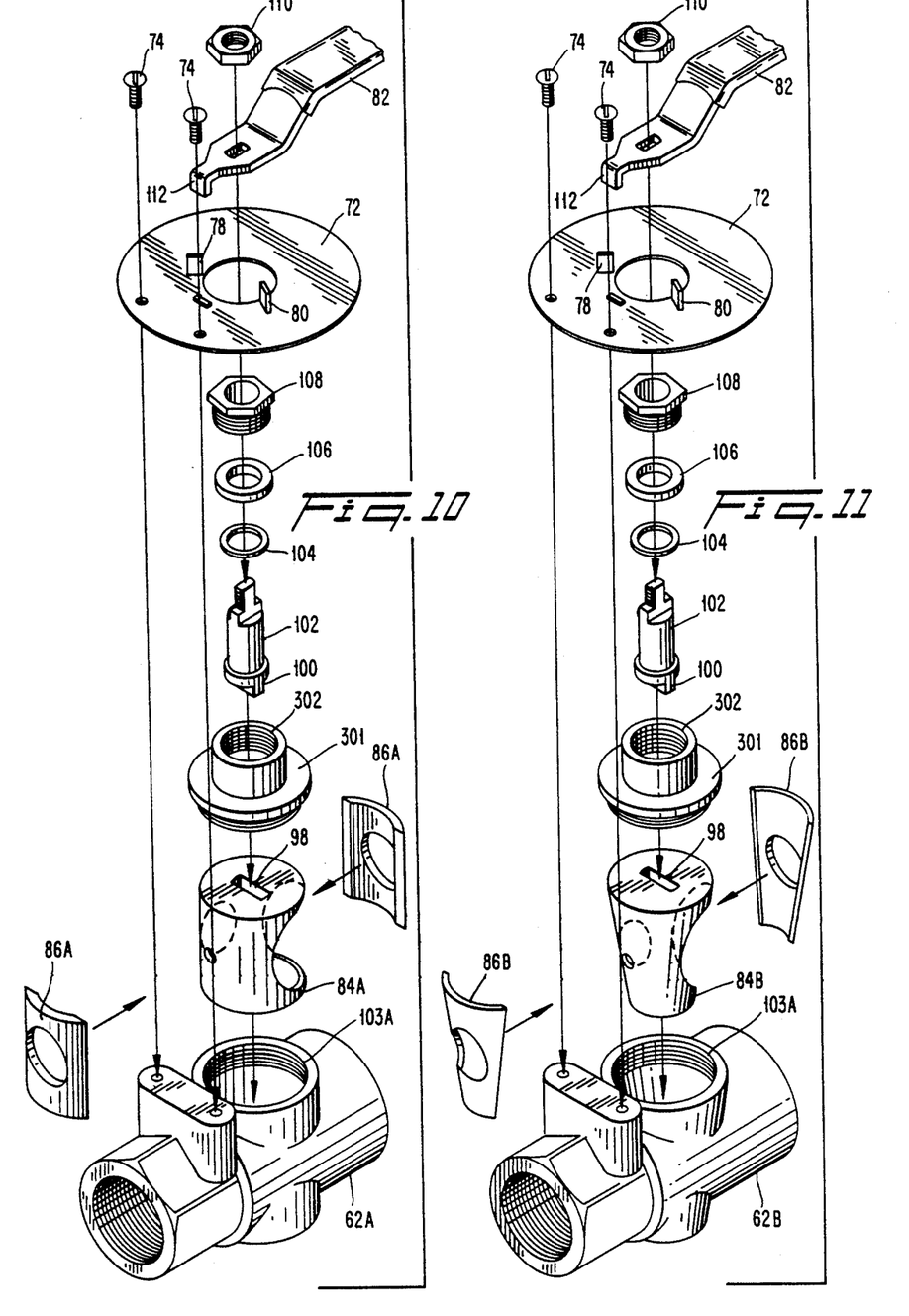
FIGS. 10, 10A and 10B are exploded views of additional embodiments of the present invention.
FIGS. 11, 11A and 11B are exploded views of additional embodiments of the present invention.

With reference to FIG. 10, a valve member 84A in the shape of a cylinder is inserted along with sealing members 86A into the housing 62A through the threaded opening 103A. The valve member and seals are secured in the housing 62A by valve cover 301 which is threadably mated with opening 103A. The valve member is provided with a slot 98 which is adapted to receive a lowermost tab 100 of a stem 102. The stem is inserted into the valve housing 62A through a threaded opening 302 of valve cover 301. The stem is provided with an annular bearing 104 and is sealed by a packing 106. A threaded retainer 108 maintains the stem in secure engagement with the slot of the valve member 84 by mating with threaded opening 302 of the valve cover 301.

Figures 10A, 11A:
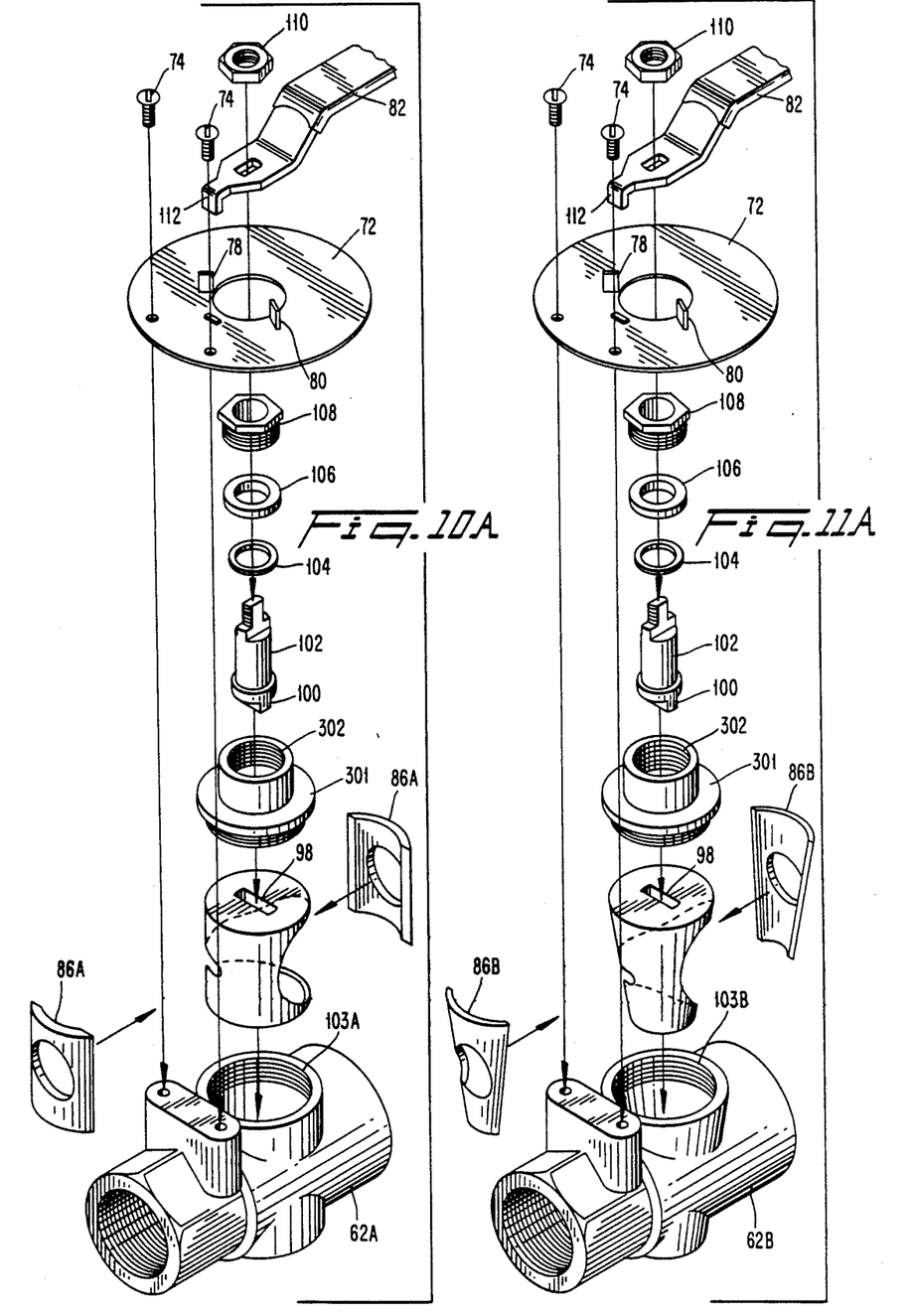
Figures 10B, 11B:
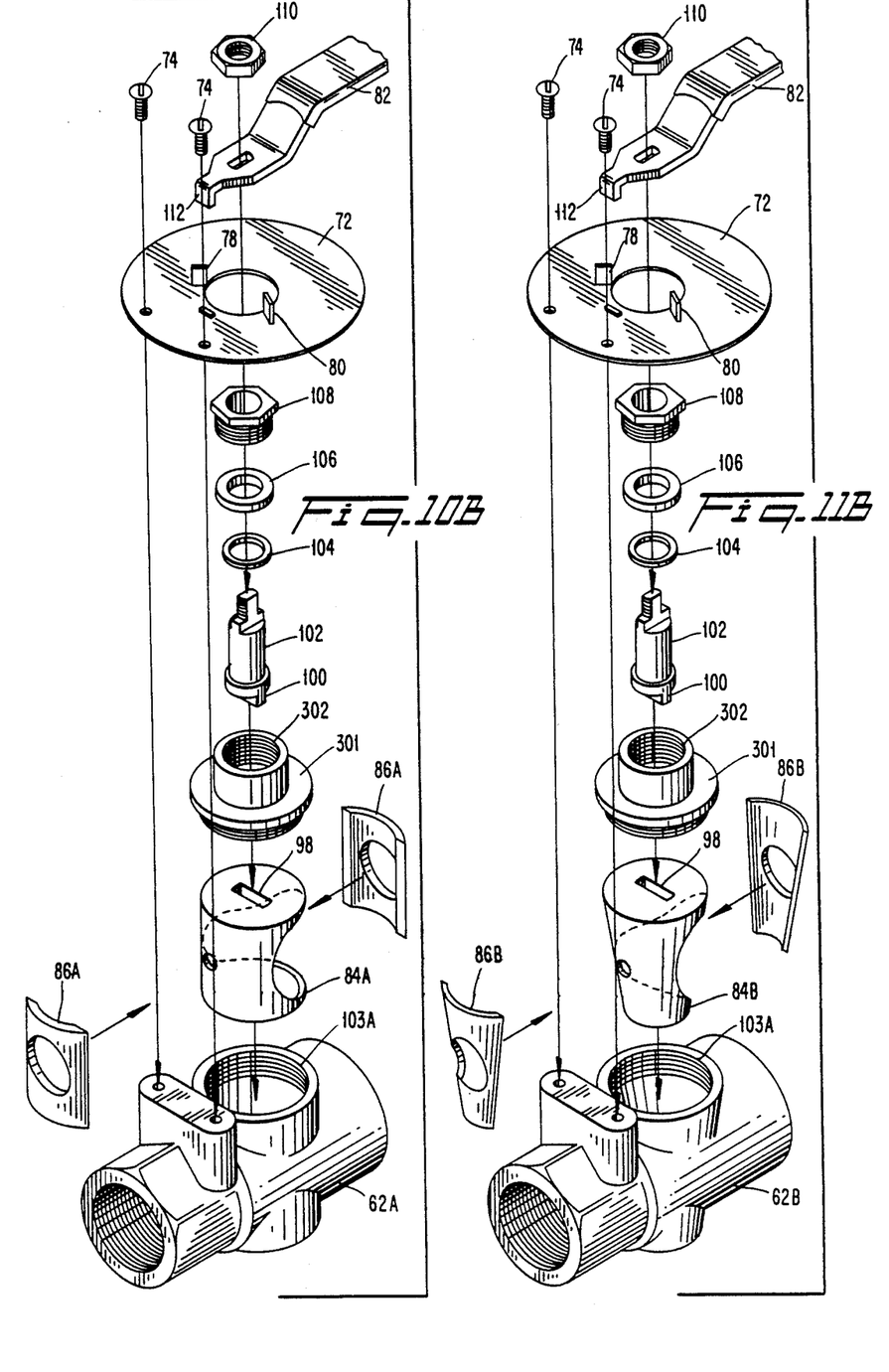

The stop plate 72 is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the valve member 84 is likewise limited to movement between the "off", "test" and "drain" positions. With reference to FIG. 10A, a valve having a valve member in the shape of a cylinder with a single port is shown. With reference to FIG. 10B, a valve having a valve member in the shape of a cylinder with a double port is shown.

With reference to FIG. 11, a valve member 84B in the shape of a truncated cone is inserted along with sealing members 86B into the housing 62B through the threaded opening 103A. The valve member and seals are secured in the housing 62B by valve cover 301 which is threadably mated with opening 103A. The ball member is provided with a slot 98 which is adapted to receive a lowermost tab 100 of a stem 102. The stem is inserted into the valve housing 62B through a threaded opening 302 of valve cover 301. The stem is provided with an annular bearing 104 and is sealed by a packing 106. A threaded retainer 108 maintains the stem in secure engagement with the slot of the valve member 84B by mating with threaded opening 302 of the valve cover 301.

With reference to FIG. 11A, a valve according to the present invention having a valve member in the shape of a truncated cone with a single port is shown. With reference to FIG. 11B, a valve according to the present invention having a valve member in the shape of a truncated cone with a double port is shown.

The stop plate 72 is then mounted on the housing by way of the screws 74. The control lever 82 is then mounted on the stem 102 by a nut 110. The control lever 82 has a depending tab 112 which selectively abuts the stops 78, 80 of the stop plate 72 to limit movement of the control lever. In this way, movement of the valve member 84 is likewise limited to movement between the "off", "test" and "drain" positions.

Figures 7, 8A, 8B, 8C:
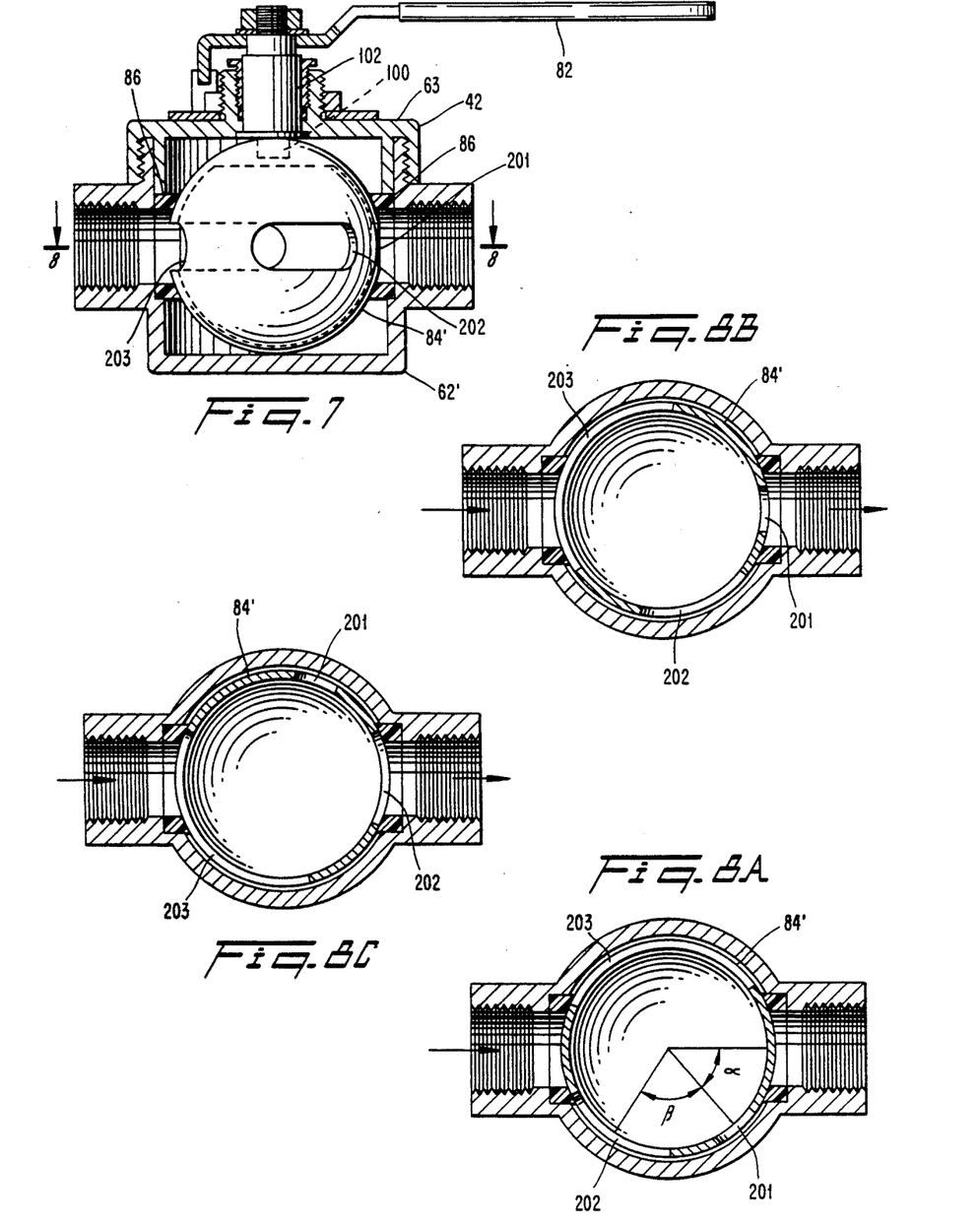
FIG. 7 is a view in partial cross-section of another embodiment of the valve according to the present invention.
FIGS. 8A-8C are cross-sectional views of the valve of FIG. 7 with the lever in the "off", "test" and "drain" positions, respectively.

With reference now to FIG. 7, another embodiment of the valve according to the present invention includes a valve housing 62' which is generally circular in cross-section. The upper end of the housing 62' is adapted to threadably receive a cap portion 63 which receives the stem 102, the control lever 82 and the stop plate as in the embodiment of FIG. 5. In the embodiment of FIG. 7, a valve member 84' and seats 86 are assembled in the valve housing through the cap portion 63.

With reference to FIGS. 8A-8C, the valve member 84' is mounted in the valve 42' of FIG. 7 in various positions providing for operation of the valve. In FIG. 8A, the control lever is oriented such that the valve is in the "off" position. In FIG. 8B, the control lever has been rotated an angle α of approximately 45° such that the valve is in the "test" position wherein water from the valve inlet is allowed to proceed through the third aperture 203, into the substantially hollow portion of the member 84', and to the valve outlet through the first aperture 201 which has a cross-sectional area equal to that of a single sprinkler head. In FIG. 8C, the control lever has been rotated an angle β of approximately 75° such that the valve is in the "drain" position wherein water from the valve inlet is allowed to proceed through the third aperture 203, into the substantially hollow portion of the member 84', and to the valve outlet through the second aperture 202 which has a cross-sectional area which allows for quick drainage of the sprinkler system.

Figure 9A:
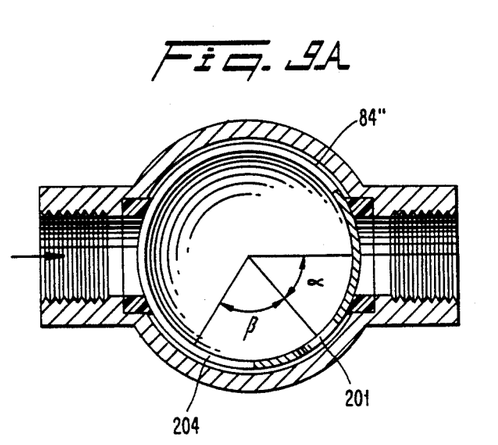
FIGS. 9A-9C are cross-sectional views of a second embodiment of the valve of FIG. 7 with the lever in the "off", "test" and "drain" positions, respectively.
Figure 9B:
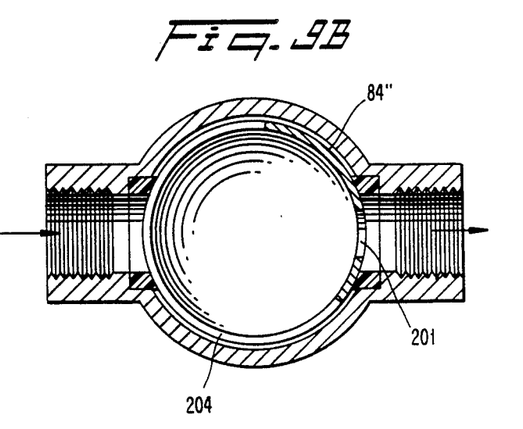
Figure 9C:
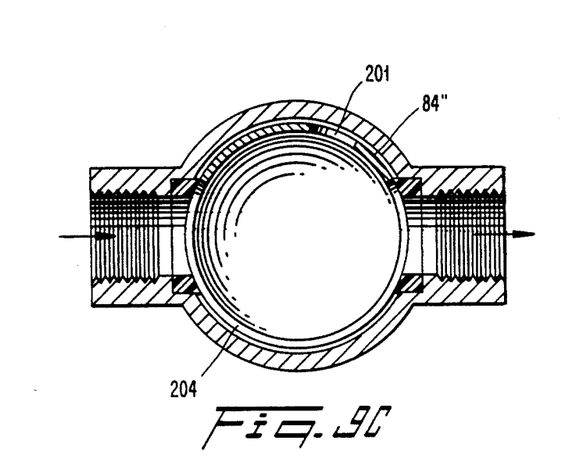

In an additional embodiment as shown in FIGS. 9A-9C, a valve member 84" can be configured with two apertures instead of three by combining the second and third apertures 202, 203 into a single large aperture 204. By combining the second and third apertures, additional material can be eliminated from the valve member and thus further reduce cost and weight while still retaining the drain and test capabilities of the valve. In FIG. 9A, the control lever is oriented in the "off" position. In FIG. 9B, the control lever has been rotated an angle α of approximately 45° to the "test" position. In the test position, water from the valve inlet is allowed to proceed through the large aperture 204 into the substantially hollow portion of the member 84" to the valve outlet through the first aperture 201 which has a cross-sectional area corresponding to that of a single sprinkler head. In FIG. 9C, the control lever has been rotated through an angle β of approximately 75° to the "drain" position. In the "drain" position, water from the valve inlet is allowed to proceed through the large aperture 204 into the substantially hollow portion of the member 84" and to the valve outlet again through the large aperture 204. Since the large aperture 204 is of a cross-sectional area greater than the valve outlet, flow from the outlet will proceed unrestricted to the outlet and thus provide for quick drainage.

Figure 12A:
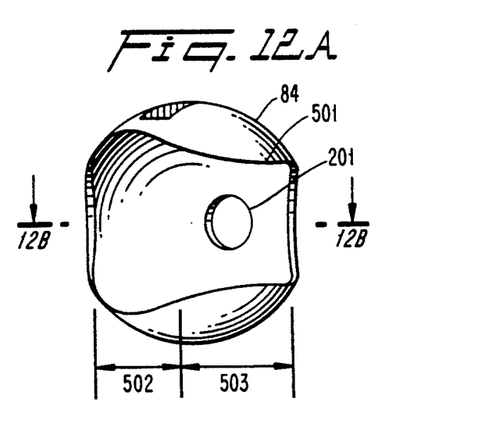
FIGS. 12A-12B are views of an additional embodiment of the valve member of the valve in FIG. 5.
Figure 12B:
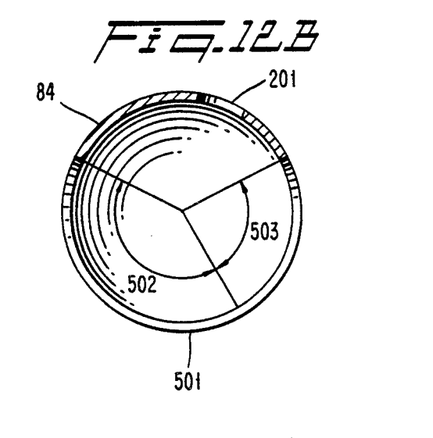

The combining of the second and third apertures may be done in such a way as to give an aperture as configured in FIGS. 12A-B. As shown in FIGS. 12A-B, the aperture 501 resulting from the combination of the second and third apertures may have a large portion 502 and a medium sized portion 503 that generally correspond in cross-sectional area to the original second and third apertures 202, 203. The operation is the same as that discussed above with respect to FIGS. 9A-9C.

Figure 13A:
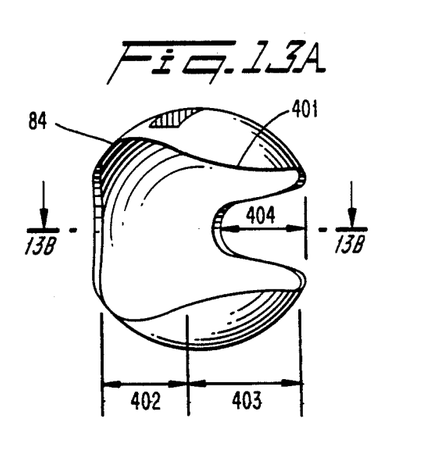
FIGS. 13A-13B are views of an additional embodiment of the valve member of the valve in FIG. 5.
Figure 13B:
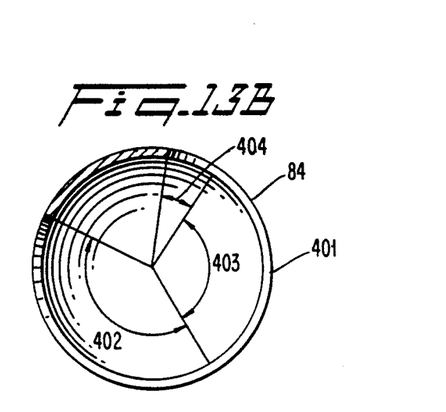

In yet another embodiment, a valve member may be provided wherein all of the apertures are combined into a single varying geometry aperture 401 as shown in FIGS. 13A-B. In this way, yet additional material can be eliminated from the valve member and thus yet further reduce cost and weight while still retaining the drain and test capabilities of the valve. Specifically, the aperture is configured to have a large sized portion 402, a medium sized portion 403 and a small sized portion 404, each of which is configured to have generally the same cross-sectional area of the corresponding apertures 201, 202, 203 of the ball member of FIG. 6. The single aperture valve member 401 functions in the same manner as discussed previously with respect to the valve members of FIGS. 8A-8C and 9A-9C.

In operation, the arrangement according to the present invention is initially configured with the control lever in the "off" position so as to prevent a flow of water through the valve. The control lever is then rotated so as to permit a flow of water at a flow rate corresponding to a single sprinkler head through the valve in order to test the system. If the flow of water causes the flow switch to be triggered, the test is considered successful and the control lever can be returned to the off position. When desired, the lever can be further rotated to the drain position to permit an unrestricted flow of water to a suitable drainage conduit.

While the valve and arrangement according to the present invention have been described with reference to a fire suppression water sprinkler system, it is expected that the valve and the arrangement may be of general utility in systems other than water sprinkler systems. Accordingly, the principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others without departing from the spirit of the present invention and it is expressly intended that all such variations and changes which fall within the spirit and scope of the present invention as defined in the claims, be embraced thereby.

What is claimed is:

1. A valve, comprising:
  a housing defining an interior chamber having an inlet and an outlet;
  a thinly walled valve member disposed within said housing, said valve member having an aperture arranged about an outer periphery of said valve member for controlling a level of fluid flow between said inlet and outlet, said aperture having a large sized portion, a medium sized portion, and a small sized portion, said valve member being selectively positionable within said interior chamber in either one of a first, a second, and a third position, the first position preventing fluid flow from the inlet to the outlet, the second position allowing a restricted fluid flow from the inlet to the outlet through only the large sized portion and the small sized portion of said aperture, the third position allowing an unrestricted fluid flow from the inlet to the outlet through only the large sized portion and the medium sized portion of said aperture;
  seat means for selectively sealingly receiving a surface of the valve member, said seat means being disposed adjacent said outlet; and
  moving means for selectively moving said valve member amongst said first, second and third positions.

2. The valve of claim 1, wherein the valve member is generally spherical.

3. The valve of claim 1, wherein the valve member is generally cylindrical.

4. The valve of claim 1, wherein the valve member is generally conically truncated.

5. The valve of claim 1, further comprising sight glass means for permitting visual observation of a flow out of said outlet.

6. The valve of claim 5, wherein said sight glass means includes a first sight glass member and a second sight glass member each extending along a sight axis, the sight axis of the first sight glass member being offset from the sight axis of the second sight glass member by substantially 90 degrees about a line extending in a direction perpendicular to both sight axes.

7. The valve of claim 1, wherein the inlet and outlet are disposed colinearly on said valve.

8. The valve of claim 1, wherein said valve member includes an inner peripheral surface and an outer peripheral surface, said inner and outer peripheral surfaces being parallel to each other to provide said thin wall of said valve member, said thin wall having a magnitude of thickness generally smaller than a radius of said valve member, said magnitude of thickness being substantially constant over a circumference of said valve member.

9. A valve comprising:
  a housing defining an interior chamber having an inlet and an outlet;
  a thinly walled valve member disposed within said housing, said valve member having first and second apertures arranged about an outer periphery of said valve member and controlling a fluid flow between said inlet and outlet, said valve member being selectively positionable within said interior chamber in either one of a first, a second and a third position, the first position preventing fluid flow from the inlet to the outlet, the second position allowing a restricted fluid flow from the inlet to the outlet through only the first aperture and the second aperture, the third position allowing an unrestriced fluid flow from the inlet to the outlet through only the first aperture;

seat means for selectively sealingly receiving a surface of the valve member, said seat means being disposed adjacent said outlet; and moving means for selectively moving said valve member amongst said first, second and third positions.

10. The valve of claim 9, wherein the valve member is generally spherical.

11. The valve of claim 9, wherein the valve member is generally cylindrical.

12. The valve of claim 9, wherein the valve member is generally conically truncated.

13. The valve of claim 9, further comprising sight glass means for permitting visual observation of a flow out of said outlet.

14. The valve of claim 13, wherein said sight glass means includes a first sight glass member and a second sight glass member each extending along a sight axis, the sight axis of the first sight glass member being offset from the sight axis of the second sight glass member by substantially 90 degrees about a line extending in a direction perpendicular to both sight axes.

15. The valve of claim 9, wherein the inlet and outlet are disposed colinearly on said valve.

16. The valve of claim 9, wherein said valve member includes an inner peripheral surface and an outer peripheral surface, said inner and outer peripheral surfaces being parallel to each other to provide said thin wall of said valve member, said thin wall having a magnitude of thickness generally smaller than a radius of said valve member, said magnitude of thickness being substantially constant over a circumference of said valve member.

17. A valve, comprising:
a housing defining an interior chamber having an inlet and an outlet;
a thinly walled valve member disposed within said housing, said valve member having first, second and third apertures arranged about an outer periphery of said valve member and controlling a flow of fluid between said inlet and outlet, said valve member being selectively positionable within said interior chamber in either one of a first, a second, and a third position, the first position preventing fluid flow from the inlet to the outlet, the second position alowing a restricted flow from the inlet to the outlet through only the first and third apertures, the third position allowing an unrestricted fluid flow from the inlet to the outlet through only the first and second appertures.
seat means for selectively sealingly receiving a surface of the valve member, said seat means being disposed adjacent said outlet; and
moving means for selectively moving said valve member amongst said first, second and third positions.

18. The valve of claim 17, wherein the valve member is generally spherical.

19. The valve of claim 17, wherein the valve member is generally cylindrical.

20. The valve of claim 17, wherein the valve member is generally conically truncated.

21. The valve of claim 17, further comprising sight glass means for permitting visual observation of a flow out of said outlet.

22. The valve of claim 21, wherein said sight glass means includes a first sight glass member and a second sight glass member each extending along a sight axis, the sight axis of the first sight glass member being offset from the sight axis of the second sight glass member by substantially 90 degrees about a line extending in a direction perpendicular to both sight axes.

23. The valve of claim 17, wherein the inlet and outlet are disposed colinearly on said valve.

24. The valve of claim 17, wherein said valve member includes an inner peripheral surface and an outer peripheral surface, said inner and outer peripheral surfaces being parallel to each other to provide said thin wall of said valve member, said thin wall having a magnitude of thickness generally smaller than a radius of said valve member, said magnitude of thickness being substantially constant over a circumference of said valve member.

25. An arrangement for testing and draining a fire suppression water sprinkler system, comprising:
conduit means for supplying water to a plurality of sprinklers;
means for sensing a flow of water in said conduit means;
valve means provided downstream of said means for sensing and in communication with said conduit means, said valve comprising:
a housing defining an interior chamber having an inlet and an outlet;
a thinly walled valve member disposed within said housing, said valve member having at least one aperture, said at least one aperture defining first, second, and third openings arranged about an outer periphery of said valve member and controlling a fluid flow between said inlet and outlet, said valve member being selectively positionable within said interior chamber in either one of a first, a second, and a third position, the first position preventing fluid flow from the inlet to the outlet, the second position allowing a restricted fluid flow from the inlet to the outlet through the first and third openings and preventing a fluid flow through the second opening, the third position allowing an unrestricted fluid flow from the inlet to the outlet through the first and second openings and preventing a fluid flow through the third opening;
seat means for selectively sealingly receiving a surface of the valve member, said seat means being disposed adjacent said outlet; and
moving means for selectively moving said valve member amongst said first, second and third positions.

26. The arrangement of claim 25, wherein the valve member is generally spherical.

27. The arrangement of claim 25, wherein the valve member is generally cylindrical.

28. The arrangement of claim 25, wherein the valve member is generally conically truncated.

29. The arrangement of claim 25, further comprising sight glass means for permitting visual observation of a flow out of said outlet.

30. The arrangement of claim 29, wherein said sight glass means includes a first sight glass member and a second sight glass member each extending along a sight axis, the sight axis of the first sight glass member being offset from the sight axis of the second sight glass member by substantially 90 degrees about a line extending in a direction perpendicular to both sight axes.

31. The arrangement of claim 25, wherein the inlet and outlet are disposed colinearly on said valve.

32. The arrangement of claim 25, wherein said valve member includes an inner peripheral surface and an outer peripheral surface, said inner and outer peripheral surfaces being parallel to each other to provide said thin wall of said valve member, said thin wall having a magnitude of thickness generally smaller than a radius of said valve member, said magnitude of thickness being substantially constant over a circumference of said valve member.

33. The arrangement of claim 25, wherein the valve member has first and second apertures, said first and second apertures defining said first, second, and third openings.

34. The arrangement of claim 25, wherein the valve member has first, second, and third apertures said first apertures defining said first opening, said second aperture defining said second opening, and said third aperture defining said third opening.

* * * * *